United States Patent
Suraparaju (10) Patent No.: US 11,463,428 B2
(45) Date of Patent: Oct. 4, 2022

(54) METHOD AND SYSTEM OF PIGGYBACKING USER REGISTRATION WITH MIRRORED IDENTITIES TO ACHIEVE FEDERATION WITHOUT ON-PREMISES IDENTITIES

(71) Applicant: Konica Minolta Business Solutions U.S.A., Inc., Ramsey, NJ (US)

(72) Inventor: Rahul Suraparaju, Fremont, CA (US)

(73) Assignee: KONICA MINOLTA BUSINESS SOLUTIONS U.S.A., INC., Ramsey, NJ (US)

( * ) Notice: Subject to any disclaimer, the term of this patent is extended or adjusted under 35 U.S.C. 154(b) by 190 days.

(21) Appl. No.: 16/834,285

(22) Filed: Mar. 30, 2020

(65) Prior Publication Data

US 2021/0306322 A1    Sep. 30, 2021

(51) Int. Cl.
*H04L 9/40* (2022.01)

(52) U.S. Cl.
CPC ...... *H04L 63/0815* (2013.01); *H04L 63/0861* (2013.01); *H04L 63/0884* (2013.01); *H04L 63/0892* (2013.01)

(58) Field of Classification Search
CPC ............. H04L 63/0815; H04L 63/0861; H04L 63/0884; H04L 63/0892; H04L 63/083
See application file for complete search history.

(56) References Cited

U.S. PATENT DOCUMENTS

| | | | | |
|---|---|---|---|---|
| 10,701,067 | B1* | 6/2020 | Ziraknejad | G06F 21/6209 |
| 2014/0208408 | A1* | 7/2014 | Bilgen | H04L 63/0815 |
| | | | | 726/8 |
| 2015/0188906 | A1* | 7/2015 | Minov | H04L 63/062 |
| | | | | 726/8 |
| 2018/0007059 | A1* | 1/2018 | Innes | G06F 21/6218 |
| 2019/0058706 | A1* | 2/2019 | Feijoo | G06F 21/41 |
| 2019/0089702 | A1* | 3/2019 | Bhatt | H04L 63/0861 |
| 2020/0382495 | A1* | 12/2020 | Belov | H04L 63/0815 |

FOREIGN PATENT DOCUMENTS

WO    WO-2012149384 A1 *    11/2012    ......... H04L 63/0815

* cited by examiner

*Primary Examiner* — Huan V Doan
(74) *Attorney, Agent, or Firm* — Buchanan Ingersoll & Rooney PC (57) ABSTRACT

A method, a non-transitory computer readable medium, and a system are disclosed for user registration with mirrored identities to achieve federation without on-premises identities. The method including: forwarding, from a computer processor, a password-based authentication request for a user to an active directory for access to cloud services; receiving, on the computer processor, a cloud authentication from the active directory for the user; piggybacking, on the computer processor, the cloud authentication for the user from the active directory with a FIDO2 registration to an authentication server; requesting, by the computer processor, an application or service from a cloud provider with the cloud authentication for the user from the FIDO2 registration; and receiving, on the computer processor, the application or service from the cloud provider.

18 Claims, 6 Drawing Sheets

METHOD AND SYSTEM OF PIGGYBACKING USER REGISTRATION WITH MIRRORED IDENTITIES TO ACHIEVE FEDERATION WITHOUT ON-PREMISES IDENTITIES

FIELD OF THE INVENTION

The present disclosure generally relates to methods and systems of piggybacking user registration with mirrored identities to achieve federation without on-premises identities.

BACKGROUND OF THE INVENTION

Single sign-on (SSO) is an authentication process that allows a user to access multiple applications with one set of login credentials. Single sign-on, for example, is a common procedure in enterprises, where a client accesses multiple resources connected to a local area network (LAN).

Federation has been the de-facto standard pursued by several authentication systems and networks offer strong password-less custom authentication solution at on-premises ("on-prem") using on-premises identities (for example, Active Directory (AD)), and upon strong authenticating users these systems 'federate' those identities towards cloud using SAML federation protocol to achieve single sign-on.

In effect, secure service authorizations are given to authenticated users whose identities sourced at on-premises AD. Password-less domain authentication for users can be achieved, for example, using domain smart card solution, during which Kerberos communication happens with on-premises AD which acts as Key Distribution Center (KDC) server. The KDC server being a network service that supplies session tickets and temporary session keys to users and computers within an Active Directory domain. The KDC, for example, runs on each domain controller as part of Active Directory Domain Services (AD DS).

However, such a password-less solutions can be problematic when there is no on-premises AD and user identities are stored in the cloud, against which smart card solution and Kerberos are technically not feasible.

SUMMARY OF THE INVENTION

In consideration of the above issues, while some cloud services provide (for example, like Azure AD) password-less solutions, for example, Hello For Business and direct-FIDO2 methods, it would be desirable to have an alternative method which is simpler to use and more interoperable with devices, which have iOS and Android operating systems.

In accordance with an aspect, a method is disclosed for user registration with mirrored identities to achieve federation without on-premises identities, the method comprising: forwarding, from a computer processor, a password-based authentication request for a user to an active directory for access to cloud services; receiving, on the computer processor, a cloud authentication from the active directory for the user; piggybacking, on the computer processor, the cloud authentication for the user from the active directory with a FIDO2 registration to an authentication server; requesting, by the computer processor, an application or service from a cloud provider with the cloud authentication for the user from the FIDO2 registration; and receiving, on the computer processor, the application or service from the cloud provider.

In accordance with another aspect, a non-transitory computer readable medium storing computer readable program code executed by a computer processor for a process for user registration with mirrored identities to achieve federation without on-premises identities is disclosed, the process comprising: forwarding, from the computer processor, a password-based authentication request for a user to an active directory for access to cloud services; receiving, on the computer processor, a cloud authentication from the active directory for the user; piggybacking, on the computer processor, the cloud authentication for the user from the active directory with a FIDO2 registration to an authentication server; requesting, by the computer processor, an application or service from a cloud provider with the cloud authentication for the user from the FIDO2 registration; and receiving, on the computer processor, the application or service from the cloud provider.

In accordance with a further aspect, a system is disclosed for user registration with mirrored identities to achieve federation without on-premises identities, the system comprising: a computer processor configured to: forward a password-based authentication request for a user to an active directory for access to cloud services; receive a cloud authentication from the active directory for the user; piggyback the cloud authentication for the user from the active directory with a FIDO2 registration to an authentication server; request an application or service from a cloud provider with the cloud authentication for the user from the FIDO2 registration; and receive the application or service from the cloud provider.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Reference will now be made in detail to the present preferred embodiments of the invention, examples of which are illustrated in the accompanying drawings. Wherever In cloud-native identities, the users' identities live in the cloud. Meaning all user accounts (user id and password, other attributes) and password management happens in the cloud, for example, Azure AD, Google, etc. Customers who have cloud-native identities usually have no on-premises directory services like an active directory (AD). Those users avail cloud services (for example, Azure Apps Panel) by providing user identifier (ID) and password (i.e., user name and password) or some other means.

In accordance with an exemplary embodiment, it would be desirable to have a system and method for single sign-on (SSO) services via Federation for these deployments using cloud-native identities.

In accordance with an exemplary embodiment, a "Fog" abstraction layer at on-premises is used to represent and contain one-to-one secure identities against those cloud-native-identities being registered, for example, at the custom authentication system, for example, in the Azure Application service. In accordance with an exemplary embodiment, these identities (i.e., "Fog" identities are piggyback-registered or cascade-registered at an abstraction level that's neither cloud nor on-premises (like AD) but close to on-premises. For example, this piggybacking or cascading can be done immediately after the user is authenticated against the cloud identities, and these are powered by Fast Identity Online 2 (FIDO2), and wherein the custom authentication server acts as a FIDO2 server, containing the users' FIDO2-PKI identities.

In accordance with an exemplary embodiment, anytime if there are N 'cloud' native users being registered by the custom authentication system, the custom authentication system will produce N 'mirrored' FIDO2 identities as a result of the identity-piggybacking (i.e., identity-cascading).

In accordance with an exemplary embodiment, the purpose of identify-piggybacking (i.e., identity-cascading) can be used to solve the problem during user authentication flow handling. When users are authenticated to avail cloud services, for example, via SAML single sign-on (SSO), this technique can facilitate the system with the means to use the registered mirrored identities (registered, for example, using FIDO2 registration flow, but mirror-maps one-to-one with corresponding cloud identity) in FIDO2-authenticating the users.

As known, WebAuthn and CTAP specify a standard authentication protocol, where the protocol endpoints consist of a user-controlled cryptographic authenticator, for example, a smartphone or a hardware security key and a WebAuthn Relying Party (also called a FIDO2 server). A web user agent (i.e., a web browser) together with a WebAuthn client form an intermediary between the authenticator and the relying party. A single WebAuthn client Device may support multiple WebAuthn clients. For example, a laptop may support multiple clients, one for each conforming user agent running on the laptop. A conforming user agent implements the WebAuthn JavaScript API. As its name implies, the Client to Authenticator Protocol (CTAP) enables a conforming cryptographic authenticator to interoperate with a WebAuthn client. The CTAP specification refers to two protocol versions called CTAP1/U2F and CTAP2. An authenticator that implements one of these protocols is typically referred to as an U2F authenticator or a FIDO2 authenticator, respectively. A FIDO2 authenticator that also implements the CTAP1/U2F protocol is backward compatible with U2F.

In accordance with an exemplary embodiment, using the technique of piggybacked-FIDO2 (i.e., cascaded-FIDO2) registration, allows the system to exercise FIDO2 authentication for the users when they attempt authentication via biometrics and wish to avail cloud services. In addition, before giving secure authorizations to users, strong user authentication is needed to be performed at network level. However since these deployments have no active directory (AD, etc.) to facilitate smart card logon, etc. with active directory (AD), piggybacked FIDO2-identies will solve this problem. In accordance with an exemplary embodiment, a method and system are disclosed that provide a technique of piggyback (or cascade) anchoring mirror-identities and fills the gap of 'Federation', that's otherwise is only possible with AD.

Figure 1:
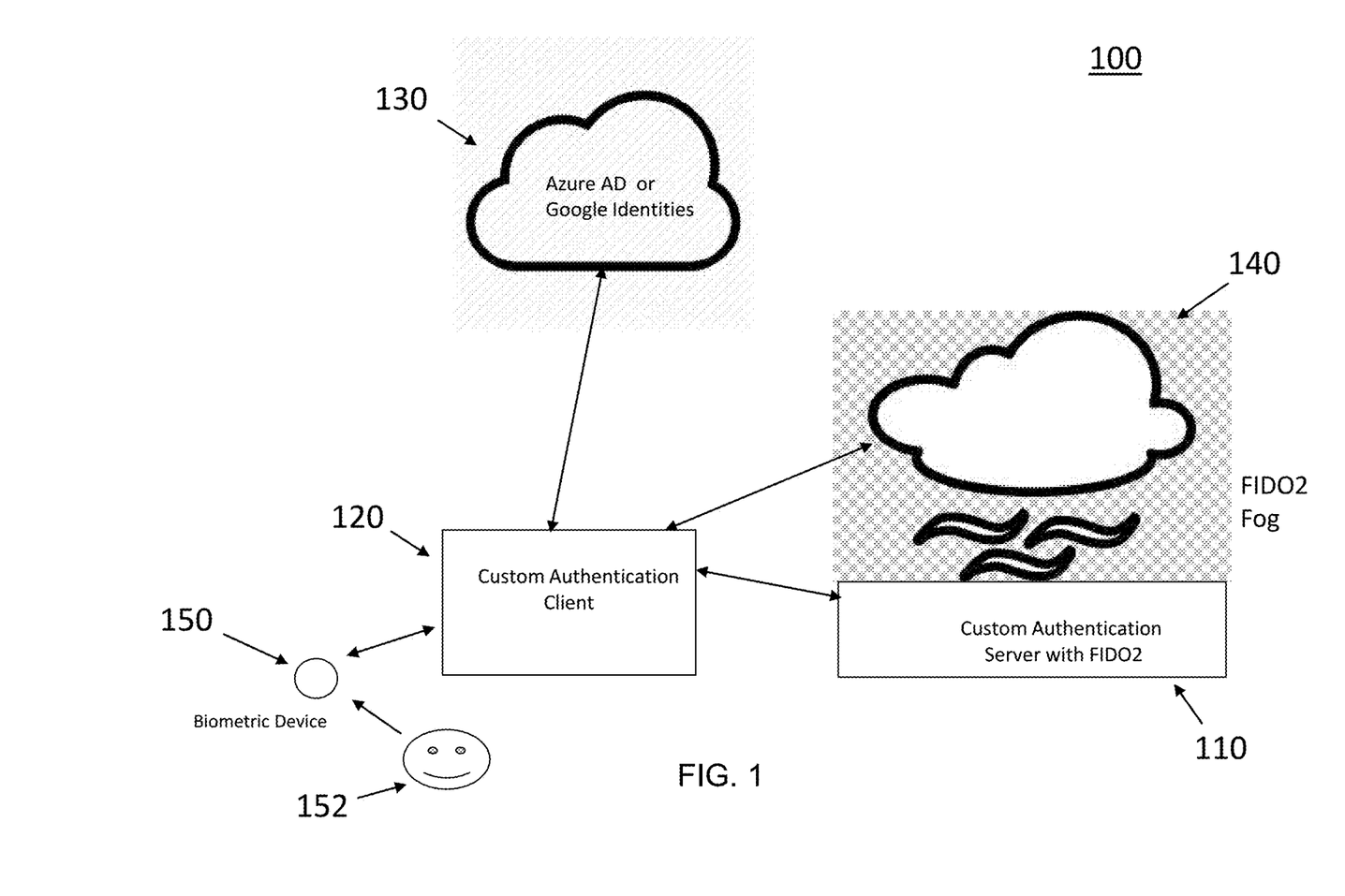
FIG. 1 is an illustration of a system for piggybacking or cascading registration with mirrored identities to achieve federation without on-premises identities in accordance with an exemplary embodiment.

FIG. 1 is an illustration of an authentication system 100 for single sign-on in accordance with an exemplary embodiment. As shown in FIG. 1, the system 100 includes an authentication server 110, an authentication client 120, an active directory (i.e., cloud-based identity and access management service, for example, Azure AD or Google) 130, and cloud service (or cloud server) 140. In accordance with an exemplary embodiment, the authentication server 110 is a custom authentication server with FIDO2 (i.e., a FIDO2 server). The authentication server 110 is configured to host a FIDO2-PKI identities of a plurality of users. As set forth herein, if N "cloud" native users being registered by the custom authentication client 120, the custom authentication client 120 will produce N "mirrored" FIDO2 identities.

In accordance with an exemplary, the authentication client 120 be, for example, a mobile client, for example, running an iOS or Android operating system (OS). In accordance with an exemplary embodiment, a user 152 may be authenticated on the custom authentication client in a password less manner, for example, via a biometric device 150.

In accordance with an exemplary embodiment, the cloud service 140 can be any service offered, for example, by Google, Dropbox, Box, Salesforce, Office365, etc., that is an application or service that is not on-premises, and wherein on-premises is a software and/or technology that is located within the physical confines of an enterprise, for example, in a data center, as opposed to running remotely on hosted servers or in the cloud (i.e., a cloud service).

Figure 2:
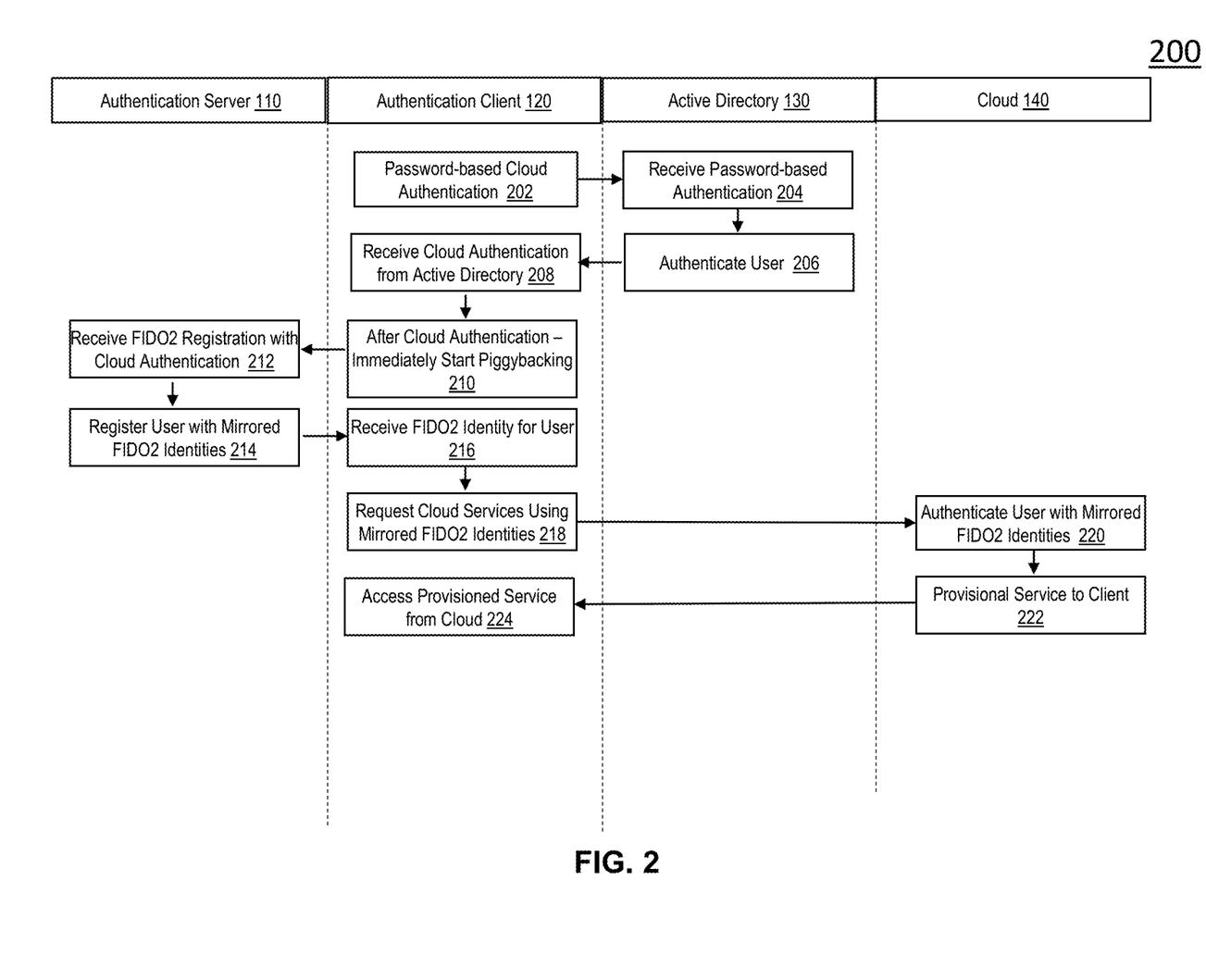
FIG. 2 is a flowchart illustrating a piggybacking or cascading registration with mirrored identities to achieve federation without on-premises identities in accordance with an exemplary embodiment.

FIG. 2 is a flowchart 200 illustrating a piggybacking or cascading registration with mirrored identities to achieve federation without on-premises identities in accordance with an exemplary embodiment. As shown in FIG. 2, in step 202, the custom authentication client sends a password-based authentication request to an active directory 130, for example, a cloud-based identity and access management service configured to provide sign in and access to cloud resources and services. In accordance with an exemplary embodiment, the password-based authentication is at least a user name and password. In step 204, the active directory receives the password-based authentication request and authenticates the user 152 (i.e., cloud authentication) in step 206. In step 208, the custom authentication client 120 receives the cloud authentication from the active directory 130 and in step 210 immediately begins registration of the user 152 with a FIDO2 registration on the custom authentication server 110. In accordance with an exemplary embodiment, in step 210 the FIDO2 registration of the user is piggybacked, anchored, or cascaded with the cloud authentication. In step 212, the authentication server 110 receives the FIDO2 registration with the cloud authentication. In step 214, the custom authentication server with FIDO2 registers the user 152 with a mirrored FIDO2 identities for the user. In step 216, the custom authentication client 120 receives a FIDO2 identity with a mirrored cloud identity for the user 52.

In step 218, the customer authentication client 120 requests cloud services 140 using the mirrored cloud identify from the FIDO2 identity of the user 152. In step 220, the cloud service 140 authenticates the user 152 with the cloud identity from the mirrored FIDO2 identities (i.e., FIDO-auth flow). In step 222, the cloud service 140 provisions services, for example, an application and/or service to the custom authentication client 120. In step 224, the custom authentication client 120 receives and accesses the provisioned services from the cloud service 140.

Figure 3:
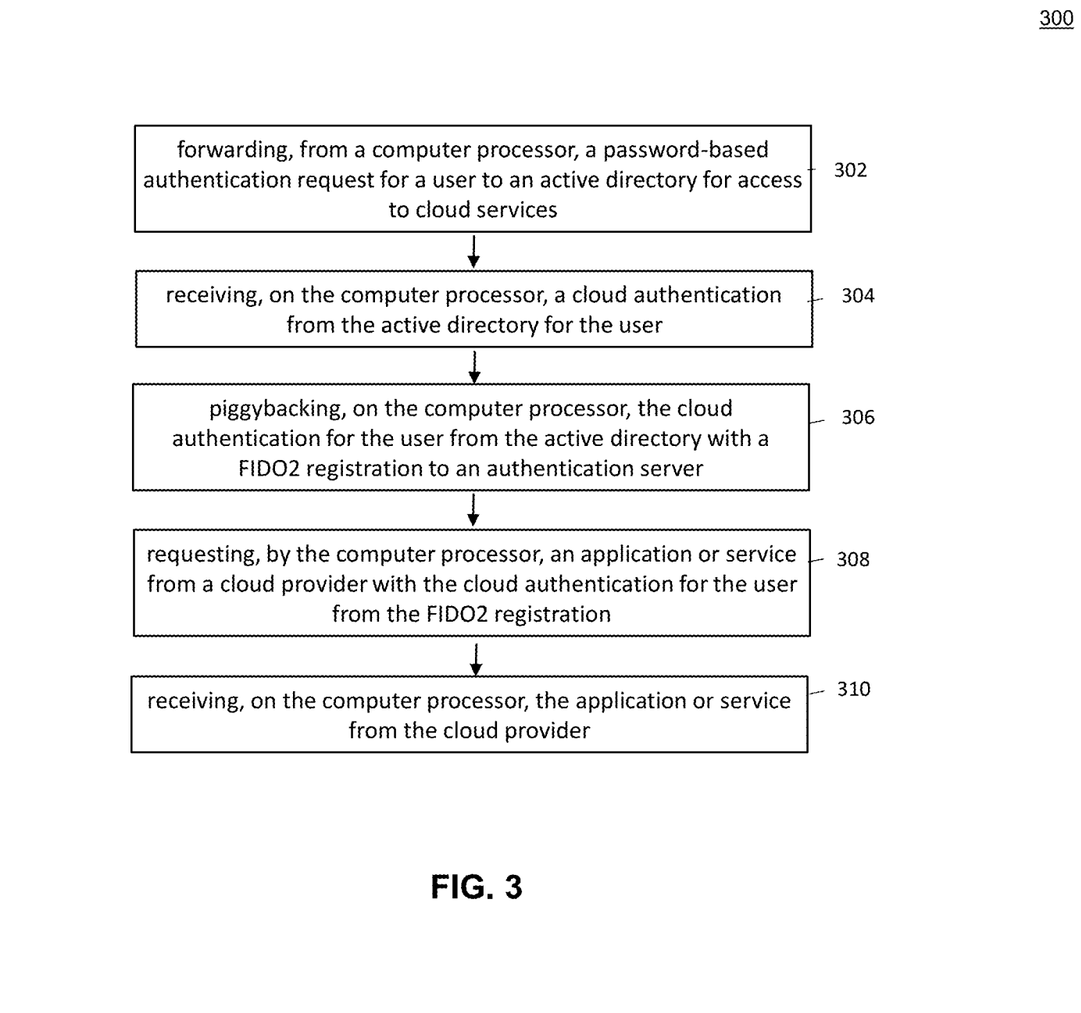
FIG. 3 is another flowchart illustrating a piggybacking or cascading registration with mirrored identities to achieve federation without on-premises identities in accordance with an exemplary embodiment.

FIG. 3 is another flowchart 300 illustrating a piggybacking or cascading registration with mirrored identities to achieve federation without on-premises identities in accordance with an exemplary embodiment. As shown in FIG. 3, in step 302, a password-based authentication request is forward for a user to an active directory for access to cloud services from a computer processor. In step 304, a cloud authentication from the active directory for the user is received on the computer processor. In step 306, the cloud authentication for the user from the active directory is piggybacked with a FIDO2 registration to an authentication server.

In step 308, a service from a cloud provider is requested with the cloud authentication for the user from the FIDO2 registration. In step 310, the application or service from the cloud provider is received.

In accordance with an exemplary embodiment, the systems and methods for a piggybacking or cascading registration with mirrored identities to achieve federation without on-premises identities can further include receiving, on the computer processor, a password-less based authentication from the user for cloud services; forwarding, from the computer processor, the password-less based authentication from the user to the authentication server for authentication of the user for the cloud services; and receiving, on the computer processor, the cloud authentication from the authentication server of the user for the cloud services. The password-less based authentication for the user for cloud services can be received, for example, via a SAML single sign-on (SSO). In accordance with an exemplary embodiment, the SAML single sign-on (SSO) comprises, for example, receiving, on the computer processor, user identification captured by a biometric device of the user; forwarding, by the computer processor, the user identification to the authentication server; and receiving, on the computer processor, the cloud authentication for the user. In accordance with an exemplary embodiment, the biometric device is a wearable biometric device configured to measures electrical activity of a heartbeat of the user as disclosed herein.

In accordance with an exemplary embodiment, the systems and methods for a piggybacking or cascading registration with mirrored identities to achieve federation without on-premises identities can further include hosting, on the authentication server, a plurality of mirrored FIDO2 identities for a plurality of users. For example, the computer processor is part of a mobile client or a personal computer, and the method further includes: provisioning, by the cloud service, the services to the mobile client or the personal computer. In accordance with an exemplary embodiment, the method can include opening a browser on a graphical user interface of the mobile client or the personal computer, and receiving a cookie from the authentication server with the cloud authentication of the user upon authentication of the user. The cookie with the cloud authentication of the user upon can be deleted, for example, after a closing of the browser on the graphical user interface of the mobile client or the personal computer.

In accordance with an exemplary embodiment, authenticating (i.e., a re-authenticating) a user on a mobile client or personal computer can include receiving, on the computer processor of the mobile client or personal computer, user identification captured by a biometric device of the user upon an opening of a new browser on the mobile client or personal computer; forwarding, by the computer processor, the user identification to the authentication server; and receiving, on the computer processor, the cloud authentication for the user.

Figure 4:
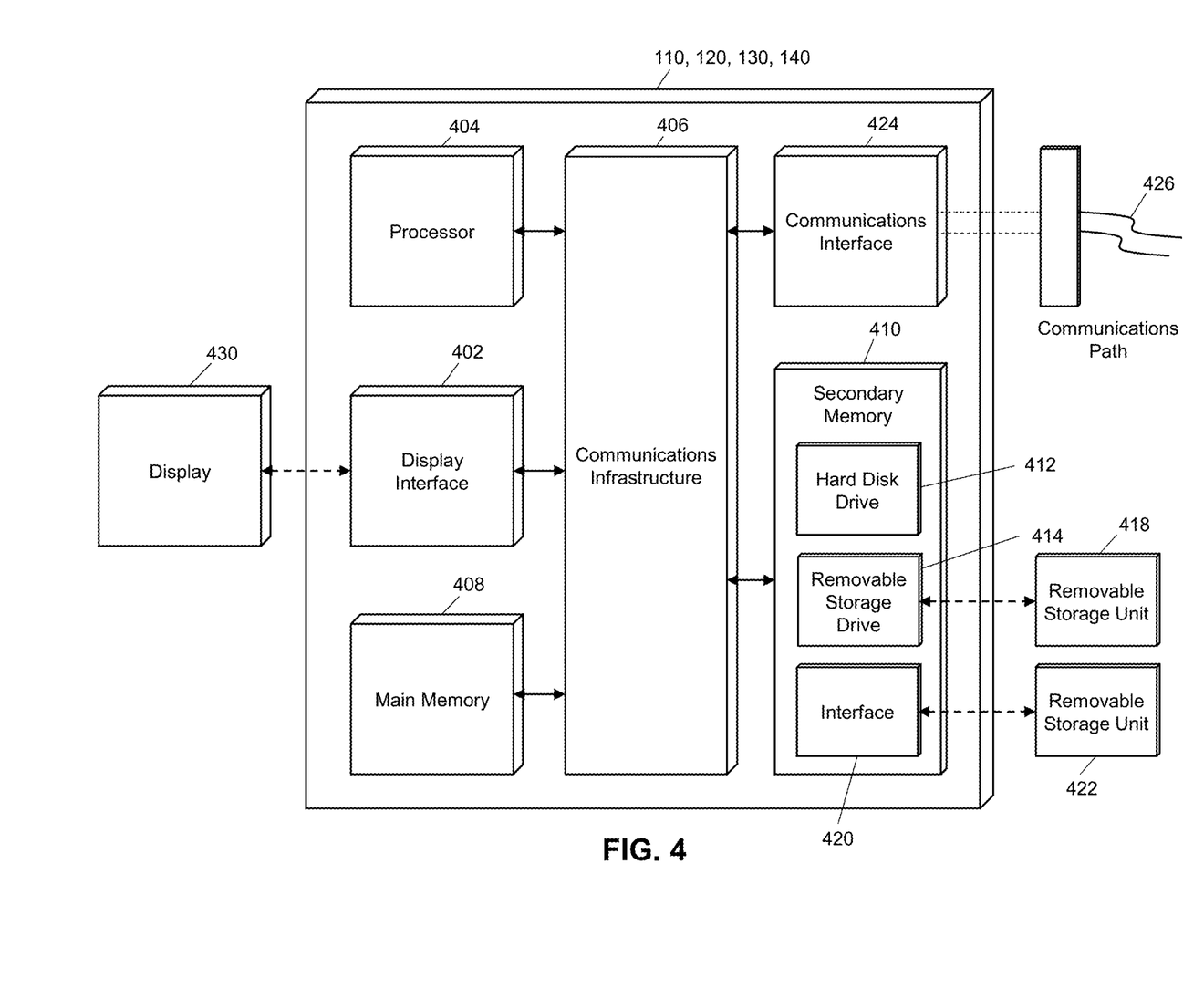
FIG. 4 is a block diagram illustrating a computer system architecture in accordance with exemplary embodiments.

FIG. 4 illustrates a computer system 110, 120, 130, 140, in which embodiments of the present disclosure, or portions thereof, may be implemented as computer-readable code. For example, the system and methods of FIGS. 1-3 may be implemented in the computer systems 110, 120, 130, 140 using hardware, software, firmware, non-transitory computer readable media having instructions stored thereon, or a combination thereof and may be implemented in one or more computer systems or other processing systems. Hardware, software, or any combination thereof may embody modules and components used to implement the system and methods of FIGS. 1-3. In accordance with an exemplary embodiment, the computer system 110, 120, 130, 140, may be a custom authentication server with FIDO2 (110), a custom authentication client (120), an Azure Active Directory (AD) or Google server (130), and/or a cloud server (140).

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device (i.e., computer processor) as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 418, a removable storage unit 422, and a hard disk installed in hard disk drive 412.

Various embodiments of the present disclosure are described in terms of this example computer system 110, 120, 130, 140. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device (or computer processor) 404 may be a special purpose or a general purpose processor device specifically configured to act as a special purpose computer to perform the functions discussed herein. The processor device 404 may be connected to a communications infrastructure 406, such as a bus, message queue, network, multi-core message-passing scheme, etc. The network may be any network suitable for performing the functions as disclosed herein and may include a local area network (LAN), a wide area network (WAN), a wireless network (for example, WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 110, 120, 130, 140 may also include a main memory 408 (for example, random access memory, read-only memory, etc.), and may also include a secondary memory 410. The secondary memory 410 may include the hard disk drive 412 and a removable storage drive 414, such as a floppy disk drive, a magnetic tape drive, an optical disk drive, a flash memory, etc.

The removable storage drive 414 may read from and/or write to the removable storage unit 418 in a well-known manner. The removable storage unit 418 may include a removable storage media that may be read by and written to by the removable storage drive 414. For example, if the removable storage drive 414 is a floppy disk drive or universal serial bus port, the removable storage unit 418 may be a floppy disk or portable flash drive, respectively. In one embodiment, the removable storage unit 418 may be non-transitory computer readable recording media.

In some embodiments, the secondary memory 410 may include alternative means for allowing computer programs or other instructions to be loaded into the computer system 110, 120, 130, 140, for example, the removable storage unit 422 and an interface 420. Examples of such means may include a program cartridge and cartridge interface (for example, as found in video game systems), a removable memory chip (for example, EEPROM, PROM, etc.) and associated socket, and other removable storage units 422 and interfaces 420 as will be apparent to persons having skill in the relevant art.

Data stored in the computer system 110, 120, 130, 140 (for example, in the main memory 408 and/or the secondary memory 410) may be stored on any type of suitable computer readable media, such as optical storage (for example, a compact disc, digital versatile disc, Blu-ray disc, etc.) or magnetic tape storage (for example, a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 110, 120, 130, 140 may also include a communications interface 424. The communications interface 424 may be configured to allow software and data to be transferred between the computer systems 110, 120, 130, 140. Exemplary communications interfaces 424 may include a modem, a network interface (for example, an Ethernet card), a communications port, a PCMCIA slot and card, etc. Software and data transferred via the communications interface 424 may be in the form of signals, which may be electronic, electromagnetic, optical, or other signals as will be apparent to persons having skill in the relevant art. The signals may travel via a communications path 426, which may be configured to carry the signals and may be implemented using wire, cable, fiber optics, a phone line, a cellular phone link, a radio frequency link, etc.

The computer system 110, 120, 130, 140, may further include a display interface 402. The display interface 402 may be configured to allow data to be transferred between the computer system 110, 120, 130, 140 and external display 430. Exemplary display interfaces 402 may include high-definition multimedia interface (HDMI), digital visual interface (DVI), video graphics array (VGA), etc. The display 430 may be any suitable type of display for displaying data transmitted via the display interface 402 of the computer system 110, 120, 130, 140 including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 408 and secondary memory 410, which may be memory semiconductors (for example, DRAMs, etc.). These computer program products may be means for providing software to the computer system 110, 120, 130, 140. Computer programs (for example, computer control logic) may be stored in the main memory 408 and/or the secondary memory 410. Computer programs may also be received via the communications interface 424. Such computer programs, when executed, may enable computer system 110, 120, 130, 140 to implement the present methods as discussed herein. In particular, the computer programs, when executed, may enable processor device 404 to implement the system and methods illustrated by FIGS. 1-3, as discussed herein. Accordingly, such computer programs may represent controllers of the computer system 110, 120, 130, 140. Where the present disclosure is implemented using software, the software may be stored in a computer program product and loaded into the computer system 110, 120, 130, 140 using the removable storage drive 414, interface 420, and hard disk drive 412, or communications interface 424.

The processor device 404 may comprise one or more modules or engines configured to perform the functions of the computer system 110, 120, 130, 140. Each of the modules or engines may be implemented using hardware and, in some instances, may also utilize software, such as corresponding to program code and/or programs stored in the main memory 408 or secondary memory 410. In such instances, program code may be compiled by the processor device 404 (for example, by a compiling module or engine) prior to execution by the hardware of the computer system 110, 120, 130, 140. For example, the program code may be source code written in a programming language that is translated into a lower level language, such as assembly language or machine code, for execution by the processor device 404 and/or any additional hardware components of the computer system 110, 120, 130, 140. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 110, 120, 130, 140 to perform the functions disclosed herein. It will be apparent to persons having skill in the relevant art that such processes result in the computer system 110, 120, 130, 140 being a specially configured computer system 110, 120, 130, 140 uniquely programmed to perform the functions discussed above.

Figure 5:
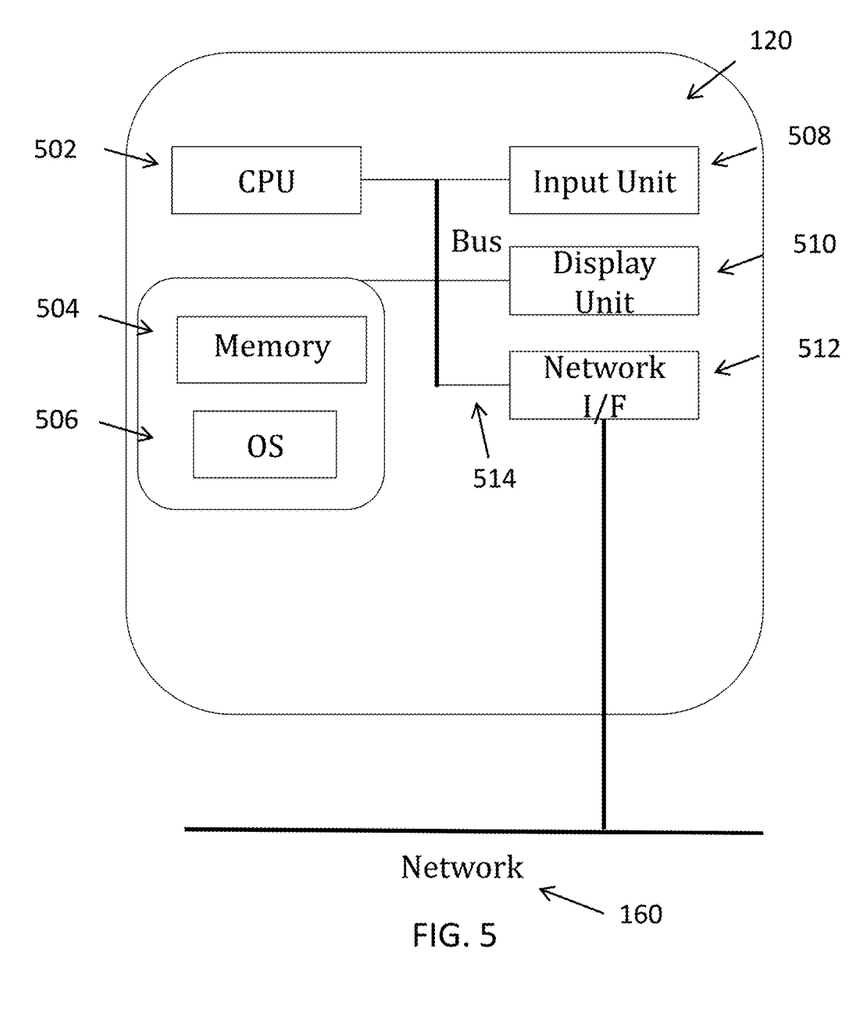
FIG. 5 is an illustration of a custom authentication client in the form of a mobile client or mobile device, in accordance with an exemplary embodiment.

FIG. 5 is an illustration of a custom authentication client 120 for example, in the form of a mobile client or mobile device in accordance with an exemplary embodiment. As shown in FIG. 5, the exemplary custom authentication client 120 can include a processor or central processing unit (CPU) 502, and one or more memories 504 for storing software programs and data, an operating system 506. In accordance with an exemplary embodiment, the operating system 506 may be iOS or Android. The processor or CPU 502 carries out the instructions of a computer program, which operates and/or controls at least a portion of the functionality of the custom authentication client 120. The custom authentication client 120 can also include an input unit 508, a display unit or graphical user interface (GUI) 510, and a network interface (I/F) 512, which is connected to a communication network (or network) 160. A bus 514 can connect the various components 502, 504, 506, 508, 510, 512, within the custom authentication client 120.

In accordance with an exemplary embodiment, the mobile device 300 can include a display unit or graphical user interface (GUI) 308, which can access, for example, a web browser (not shown) in the memory 304 of the mobile device 300. The mobile device 300 also includes the operating system (OS) 320, which manages the computer hardware and provides common services for efficient execution of various software programs. In accordance with an exemplary embodiment, the OS 320 of the mobile device 300 is a Linux or Windows® based operating system. The software programs can include, for example, application software and printer driver software. For example, the printer driver software controls a multifunction printer or printer (not shown), for example connected with the mobile device 300 in which the printer driver software is installed via the communication network 150. In certain embodiments, the printer driver software can produce a print job and/or document based on an image and/or document data In accordance with an exemplary embodiment, the mobile device 300 can also preferably include an authentication module, which authenticates a user, for example, by fingerprint recognition or authentication, or other authentication protocol, which are currently implemented or will be implemented on mobile devices. For example, a password authentication protocol, which uses credentials, such as username and password can be used. In accordance with an exemplary embodiment, the authentication module can be for access to the mobile device 140 and/or used in connection with a single sign-on (SSO) process as disclosed herein.

Figure 6:
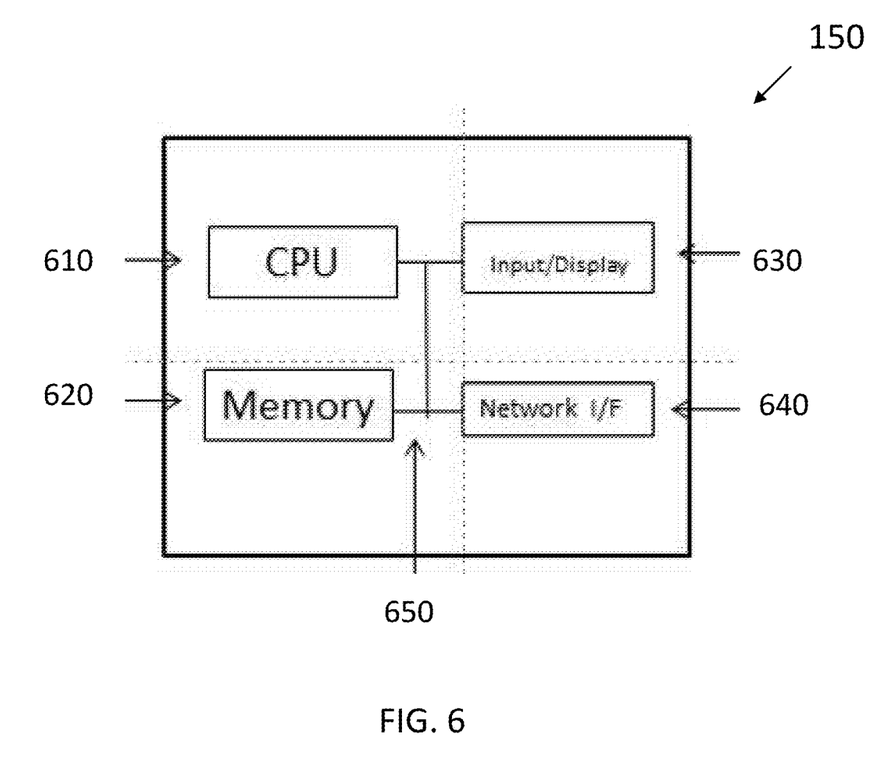
FIG. 6 is an illustration of a biometric device in accordance with an exemplary embodiment.

FIG. 6 is an illustration of a biometric device 150 in accordance with an exemplary embodiment. In accordance with an exemplary embodiment, the exemplary biometric device 150 is a security identification and authentication device, which uses automated methods of verifying or recognizing the identity of a living person based on a physiological or behavioral characteristic. The method of recognizing the user can include, for example, fingerprints, electrocardiogram (ECG or EKG) information, facial images, iris, and voice recognition. For example, in accordance with an exemplary embodiment, the biometric device 150 is a wearable device, for example, a Nymi™ band, which detection of the user is based on the electrocardiogram (ECG) and its unique properties, i.e., electrical activity of the heartbeat of the wearer.

As shown in FIG. 6, the biometric device 150 can include a processor or central processing unit (CPU) 610, and one or more memories 620 for storing software programs and data, for example, an operating system. In accordance with an exemplary embodiment, the processor or CPU 610 carries out the instructions of a computer program, which operates and/or controls at least a portion of the functionality of the biometric device 150. The biometric device 150 can also include an input unit and/or display unit or graphical user interface (GUI) 630, and a network interface (I/F) 640, which is configured to connect the biometric device 150 to the computer system 120 via, for example, a wire or wireless technology, for example, Bluetooth. A bus 650 can connect the various components 610, 620, 630, 640, within the biometric device 150.

In accordance with an exemplary embodiment, the methods and processes as disclosed can be implemented on a non-transitory computer readable medium. The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present disclosure may be implemented such that its software part has been written onto a recording medium in advance and will be read as required in operation.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for user registration with mirrored identities to achieve federation without on-premises identities, the method comprising:
   opening, by a computer processor, a browser on a graphical user interface of a computer system in which the computer processor is running;
   forwarding, from the computer processor, a password-based authentication request for a user to an active directory for access to cloud services;
   receiving, on the computer processor, a cloud authentication from the active directory for the user;
   piggybacking, on the computer processor, the cloud authentication for the user from the active directory with a Fast Identity Online 2 (FIDO2) registration to an authentication server;
   receiving, on the computer processor, a cookie from the authentication server with the cloud authentication of the user upon authentication of the user from the FIDO registration;
   requesting, by the computer processor, an application or service from a cloud provider with the cloud authentication for the user from the FIDO2 registration;

receiving, on the computer processor, the application or service from the cloud provider; and deleting, by the computer processor, the cookie with the cloud authentication of the user upon a closing of the browser on the graphical user interface of the computer system.

2. The method according to claim 1, further comprising:
receiving, on the computer processor, a password-less based authentication from the user for cloud services;
forwarding, from the computer processor, the password-less based authentication from the user to the authentication server for authentication of the user for the cloud services; and
receiving, on the computer processor, the cloud authentication from the authentication server of the user for the cloud services.

3. The method according to claim 2, further comprising:
receiving, on the computer processor, the password-less based authentication for the user for cloud services via a SAML single sign-on (SSO).

4. The method according to claim 3, wherein the SAML single sign-on (SSO) comprises:
receiving, on the computer processor, user identification captured by a biometric device of the user;
forwarding, by the computer processor, the user identification to the authentication server; and
receiving, on the computer processor, the cloud authentication for the user.

5. The method according to claim 4, wherein the biometric device is a wearable biometric device configured to measures electrical activity of a heartbeat of the user.

6. The method according to claim 1, further comprising:
hosting, on the authentication server, a plurality of mirrored FIDO2 identities for a plurality of users.

7. The method according to claim 1, wherein the computer system is a mobile client or a personal computer.

8. The method according to claim 1, further comprising:
receiving, on the computer processor of the computer system, user identification captured by a biometric device of the user upon an opening of a new browser on the computer system;
forwarding, by the computer processor, the user identification to the authentication server; and
receiving, on the computer processor, the cloud authentication for the user.

9. A non-transitory computer readable medium storing computer readable program code executed by a computer processor for a process for user registration with mirrored identities to achieve federation without on-premises identities, the process comprising:
opening, by the computer processor, a browser on a graphical user interface of a computer system in which the computer processor is running;
forwarding, from the computer processor, a password-based authentication request for a user to an active directory for access to cloud services;
receiving, on the computer processor, a cloud authentication from the active directory for the user;
piggybacking, on the computer processor, the cloud authentication for the user from the active directory with a Fast Identity Online 2 (FIDO2) registration to an authentication server;
receiving, on the computer processor, a cookie from the authentication server with the cloud authentication of the user upon authentication of the user from the FIDO registration;

requesting, by the computer processor, an application or service from a cloud provider with the cloud authentication for the user from the FIDO2 registration;
receiving, on the computer processor, the application or service from the cloud provider; and
deleting, by the computer processor, the cookie with the cloud authentication of the user upon a closing of the browser on the graphical user interface of the computer system.

10. The non-transitory computer readable medium according to claim 9, further comprising:
receiving, on the computer processor, a password-less based authentication from the user for cloud services;
forwarding, from the computer processor, the password-less based authentication from the user to the authentication server for authentication of the user for the cloud services; and
receiving, on the computer processor, the cloud authentication from the authentication server of the user for the cloud services.

11. The non-transitory computer readable medium according to claim 10, further comprising:
receiving, on the computer processor, the password-less based authentication for the user for cloud services via a SAML single sign-on (SSO), and wherein the SAML single sign-on (SSO) comprises:
receiving, on the computer processor, user identification captured by a biometric device of the user;
forwarding, by the computer processor, the user identification to the authentication server; and
receiving, on the computer processor, the cloud authentication for the user.

12. The non-transitory computer readable medium according to claim 9, wherein the computer processor is part of a mobile client or a personal computer.

13. The non-transitory computer readable medium according to claim 12, further comprising:
receiving, on the computer processor of the mobile client or personal computer, user identification captured by a biometric device of the user upon an opening of a new browser on the mobile client or personal computer;
forwarding, by the computer processor, the user identification to the authentication server; and
receiving, on the computer processor, the cloud authentication for the user.

14. A system for user registration with mirrored identities to achieve federation without on-premises identities, the system comprising:
a hardware processor configured to:
open a browser on a graphical user interface of a computer system in which the hardware processor is running;
forward a password-based authentication request for a user to an active directory for access to cloud services;
receive a cloud authentication from the active directory for the user;
piggyback the cloud authentication for the user from the active directory with a Fast Identity Online 2 (FIDO2) registration to an authentication server;
receive a cookie from the authentication server with the cloud authentication of the user upon authentication of the user from the FIDO2 registration;
request an application or service from a cloud provider with the cloud authentication for the user from the FIDO2 registration;

receive the application or service from the cloud provider; and delete the cookie with the cloud authentication of the user upon a closing of the browser on the graphical user interface of the computer system.

15. The system according to claim 14, wherein the hardware processor is configured to:

receive a password-less based authentication from the user for cloud services;

forward the password-less based authentication from the user to the authentication server for authentication of the user for the cloud services; and receive the cloud authentication from the authentication server of the user for the cloud services.

16. The system according to claim 15, wherein the hardware processor is configured to:

receive the password-less based authentication for the user for cloud services via a SAML single sign-on (SSO), and wherein the SAML single sign-on (SSO) comprises:

receiving, on the computer processor, user identification captured by a biometric device of the user;

forwarding, by the computer processor, the user identification to the authentication server; and receiving, on the computer processor, the cloud authentication for the user.

17. The system according to claim 14, wherein the hardware processor is part of a mobile client or a personal computer.

18. The system according to claim 14, wherein the hardware processor is configured to:

receive user identification captured by a biometric device of the user upon an opening of a new browser on the mobile client or personal computer;

forward the user identification to the authentication server; and receive the cloud authentication for the user.

* * * * *